US011136487B2

(12) United States Patent
Amanullah et al.

(10) Patent No.: US 11,136,487 B2
(45) Date of Patent: Oct. 5, 2021

(54) DATE SEED-BASED CHIPS LOST CIRCULATION MATERIAL

(71) Applicant: Saudi Arabian Oil Company, Dhahran (SA)

(72) Inventors: Md Amanullah, Dhahran (SA); Turki Al-Subaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/800,567

(22) Filed: Feb. 25, 2020

(65) Prior Publication Data

US 2021/0261847 A1 Aug. 26, 2021

(51) Int. Cl.
*C09K 8/08* (2006.01)
*C09K 8/34* (2006.01)

(52) U.S. Cl.
CPC .................. *C09K 8/08* (2013.01); *C09K 8/34* (2013.01); *C09K 2208/04* (2013.01)

(58) Field of Classification Search
CPC ......... C09K 8/08; C09K 8/34; C09K 2208/04
See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 3,217,801 A | 11/1965 | Fast et al. |
| 4,086,098 A | 4/1978 | Le Ruyet et al. |
| 4,110,225 A | 8/1978 | Cagle |
| 4,127,548 A | 11/1978 | Alexander |
| 4,247,403 A | 1/1981 | Foley et al. |
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 4,957,166 A | 9/1990 | Sydansk |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |

(Continued)

FOREIGN PATENT DOCUMENTS

| CN | 101311243 A | 11/2008 |
|---|---|---|
| CN | 101560084 A | 10/2009 |

(Continued)

OTHER PUBLICATIONS

Md Amanullah et al. Characteristics, behavior and performance of ARC plug-a date based sized particulate LCM, SPE-182840-MS, 2016.*

(Continued)

*Primary Examiner* — Kumar R Bhushan
(74) *Attorney, Agent, or Firm* — Bracewell LLP; Constance G. Rhebergen; Brian H. Tompkins

(57) ABSTRACT

A lost circulation material (LCM) that includes chips formed from date palm seeds. The date palm seed-based chip LCM includes chips having lengths in the range of greater than 2.38 millimeters (mm) to less than 6.73 mm. Method of manufacturing the date palm seed-based chip LCM include washing and drying whole date tree seeds, such that the drying includes air-drying, hot rolling, and cooling. Methods of reducing lost circulation are also provided.

4 Claims, 3 Drawing Sheets

(56) References Cited

U.S. PATENT DOCUMENTS

| | | |
|---|---|---|
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,290,687 B1 | 3/2016 | Weaver |
| 9,376,607 B2 | 6/2016 | James |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,240,411 B1 | 3/2019 | Amanullah |
| 10,259,982 B2 | 4/2019 | Amanullah |
| 10,266,742 B1 | 4/2019 | Amanullah et al. |
| 10,323,170 B1 | 6/2019 | Amanullah et al. |
| 10,329,470 B1 | 6/2019 | Amanullah et al. |
| 10,513,647 B2 | 12/2019 | Amanullah |
| 10,519,357 B2 | 12/2019 | Amanullah |
| 10,889,747 B1 | 1/2021 | Amanullah |
| 10,895,118 B2 | 1/2021 | Amanullah |
| 10,927,282 B2 | 2/2021 | Amanullah |
| 2002/0010100 A1 | 1/2002 | Wood |
| 2004/0023813 A1 | 2/2004 | Burts, III |
| 2004/0129460 A1 | 7/2004 | Macquoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0087331 A1* | 4/2013 | Karcher ............... E21B 21/003 166/279 |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0137903 A1 | 5/2016 | Friedheim et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0312100 A1* | 10/2016 | Amanullah ............ E21B 21/003 |
| 2017/0058180 A1 | 3/2017 | Hossain et al. |
| 2017/0137688 A1* | 5/2017 | Amanullah ............ C09K 8/514 |
| 2017/0166795 A1 | 6/2017 | Walker et al. |
| 2017/0240791 A1 | 8/2017 | Oliveira et al. |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2018/0127632 A1 | 5/2018 | Amanullah |
| 2018/0201819 A1 | 7/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |
| 2019/0233705 A1 | 8/2019 | Amanullah et al. |
| 2019/0233706 A1 | 8/2019 | Adewole et al. |
| 2019/0270924 A1 | 9/2019 | Amanullah |
| 2020/0002592 A1 | 1/2020 | Amanullah |
| 2020/0079987 A1 | 3/2020 | Amanullah |
| 2020/0079988 A1 | 3/2020 | Amanullah |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| GB | 2518441 A | 3/2015 |
| JP | 0671171 A | 3/1994 |
| WO | 200153429 A1 | 7/2001 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |
| WO | 2018013619 A1 | 1/2018 |

OTHER PUBLICATIONS

Ramasamy, Jothibasu et al.; "Novel Fibrous Lost Circulation Materials Derived from Deceased Date Tree Waste" SPE-187989-MS, SPE Kingdom of Saudi Arabia Annual Technocal Symposium & Exhibition, Dammam, Apr. 24-27, 2017; pp. 1-8.

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations"

(56) References Cited

OTHER PUBLICATIONS

Journal of King Saud University—Engineering Sciences (2017); pp. 1-7.
Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.
Alsaba, M. et al.; "Review of lost ciiculation materials and treatments with an updated classification." AADE National Technical Conference and Exhibition, Houston, TX, Apr. 2014; pp. 1-9.
Amanullah, et al.; "Application of an indigenous eco-friendly raw material as fluid loss additive", Journal of Petroleum Science and Engineering, vol. 139, (2016); pp. 191-197.
Amanullah; "Characteristics, behavior and performance of ARC Plug—A date seed-based sized particulate LCM." SPE Kingdom of Saudi Arabia Annual Technical Symposium and Exhibition. Society of Petroleum Engineers, 2016; pp. 1-9.
BakerHughes.com "SOLUFLAKE Flaked Calcium Carbonate" (XP055401101) Jan. 8, 2016; p. 1.
International Search Report and Written Opinion for International Application No. PCT/US2016/062130 (SA5410/PCT); dated Jan. 27, 2017; pp. 1-12.
International Search Report and Written Opinion for International Application No. PCT/US2017/027287 (SA5508/PCT); dated Sep. 13, 2017; 11 pages.
International Search Report and Written Opinion for International Application No. PCT/US2017/039614 (SA5532/PCT); dated Sep. 11, 2017; pp. 1-12.
International Search Report and Written Opinion for International Application No. PCT/US2017/039616 (SA5533/PCT); dated Sep. 11, 2017; pp. 1-11.
International Search Report and Written Opinion for International Application No. PCT/US2017/047877 (SA5599/PCT); dated Oct. 27, 2017; pp. 1-15.
International Search Report and Written Opinion for International Application No. PCT/US2017/053355 (SA5580/PCT); International filing date Sep. 26, 2017; dated Jan. 17, 2018; pp. 1-14.
International Search Report and Written Opinion for International Application No. PCT/US2017/060079 (SA5577/PCT); International Filing Date Nov. 6, 2017; dated Dec. 18, 2017; pp. 1-14.
International Search Report and Written Opinion for International Application No. PCT/US2017/067179 (SA5600/PCT) International Filing Date Dec. 19, 2017; dated Feb. 21, 2018; pp. 1-14.
International Search Report and Written Opinion for International Application No. PCT/US2019/016614 (SA5796) dated Jun. 3, 2019; pp. 1-12.
International Search Report and Written Opinion for International Application No. PCT/US2019/022843 (SA5854) dated Jun. 3, 2019; pp. 1-13.
International Search Report and Written Opinion for International Application No. PCT/US2017/041611 (SA5534); International Filing Date Jul. 12, 2017; dated Oct. 27, 2017 (pp. 1-15).
International Search Report and Written Opinion for International Application No. PCT/US2018/034291 (SA5652/PCT); International Filing Date May 24, 2018; dated Jul. 31, 2018 (pp. 1-11).
International Search Report and Written Opinion for International Application No. PCT/US2018/048423 (SA5757); International Filing Date Aug. 29, 2018; dated Nov. 29, 2018 (pp. 1-12).
Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.
Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.
Wajheeuddin, Mohammed; "Development of an Environmentally-Friendly Drilling Fluid Using Date Seeds and Grass" Master's thesis, King Fahd University of Petroleum & Minerals, 2014; pp. 1-138.
International Search Report and Written Opinion for International Application No. PCT/US2021/019673 (SA51202), dated Jun. 18, 2021; pp. 1-14.

* cited by examiner

DATE SEED-BASED CHIPS LOST CIRCULATION MATERIAL

BACKGROUND

Field of the Disclosure

The present disclosure generally relates to controlling lost circulation in a wellbore during drilling with a drilling fluid. More specifically, embodiments of the disclosure relate to a lost circulation materials (LCMs) for moderate and severe loss zones.

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

Moderate and severe loss zones may contain gaps, fractures, vugs, and channels having sizes greater than 5 millimeters (mm). A moderate loss zone may refer to loss zones exhibiting fluid losses of in the range of 10 barrels/hour (bbl/hr) to 100 bbl/hr. A severe loss zone may refer to loss zones exhibiting fluid losses of 100 barrels/hour (bbl/hr) or greater. Existing particulate or chip LCMs may be unable to create effective bridges and flow barriers in the openings in these moderate and severe loss zones.

Typical materials used to address lost circulation in moderate and severe loss zones may include calcium carbonate chips or graphite chips having sizes in the range of 2 mm to 6 mm and densities greater than 2 grams per cubic centimeter ($g/cm^3$). However, calcium carbonate chips settle and sag in the stock tank or drilling fluid circulation system and are difficult to suspend in a carrier fluid during circulation and placement of a slurry into a loss zone. Graphite chips may also suffer from the settlement and sagging problems in the stock tank and drilling fluid circulation system. These settlement and sagging of calcium carbonate or graphite chips may be more problematic in deviated or horizontal wellbores.

Additionally, the suspension capability of a drilling mud or carrier fluid decreases in proportion to the density of the materials in the mud or fluid. Consequently, the densities of the calcium carbonate or graphite chips may make such chips difficult to suspend in the drilling mud or carrier fluid and decrease the success rate of an LCM treatment. Additionally, for a given mass concentration, the number of chips that can be incorporated into a drilling mud or carrier fluid increases with a decrease in density and may also affect the success rate of an LCM treatment.

In one embodiment, a method to reduce lost circulation of a drilling fluid in a wellbore in a formation is provided. The method includes introducing an altered drilling fluid into the wellbore while drilling such that a loss circulation material (LCM) contacts a lost circulation zone, such that the altered drilling fluid includes the drilling fluid and the LCM. The LCM consists of a plurality of chips produced from date tree seeds, each of the plurality of chips having a size in the range of greater than 2.38 millimeters (mm) to less than 6.73 mm.

In some embodiments, the altered drilling fluid consists of the drilling fluid and the LCM. In some embodiments, the drilling fluid is a water-based drilling mud or an oil-based drilling mud. In some embodiments, the plurality of chips are produced from untreated date tree seeds. In some embodiments, the plurality of chips are produced by: washing date tree seeds, drying the date tree seeds after the washing, the drying including air-drying the date tree seeds for a first time period of at least two hours, hot rolling the date tree seeds at a temperature of at least 80° C. for a second time period of at least two hours, and cooling the hot-rolled date tree seeds for a third time period of at least two hours. The plurality of chips are further produced by grinding the cooled date tree seeds, and sorting the ground date tree seeds into the plurality of chips. In some embodiments, the LCM has a specific gravity of 1.1.

In some another embodiment, an altered drilling fluid is provided. The altered drilling fluid includes a drilling fluid and a lost circulation material (LCM). The LCM consists of a plurality of chips produced from date tree seeds, each of the plurality of chips having a size in the range of greater than 2.38 millimeters (mm) to less than 6.73 mm. the altered drilling fluid consists of the drilling fluid and the LCM. In some embodiments, the drilling fluid is a water-based drilling mud or an oil-based drilling mud. In some embodiments, the plurality of chips are produced from untreated date tree seeds. In some embodiments, the plurality of chips are produced by: washing date tree seeds, drying the date tree seeds after the washing, the drying including air-drying the date tree seeds for a first time period of at least two hours, hot rolling the date tree seeds at a temperature of at least 80° C. for a second time period of at least two hours, and cooling the hot-rolled date tree seeds for a third time period of at least two hours. The plurality of chips are further produced by grinding the cooled date tree seeds, and sorting the ground date tree seeds into the plurality of chips.

In another embodiment, a lost circulation material (LCM) composition is provided. The LCM composition consists of a plurality of chips produced from date tree seeds, each of the plurality of chips having a size in the range of greater than 2.38 millimeters (mm) to less than 6.73 mm. In some embodiments, the plurality of chips are produced from untreated date tree seeds.

In another embodiment, a method of manufacturing a lost circulation material (LCM) is provided. The method includes obtaining date tree seeds, washing the date tree seeds, and drying the date tree seeds after the washing. The drying includes air-drying the date tree seeds at ambient conditions for a first time period of at least two hours, hot rolling the date tree seeds at a temperature of at least 80° C. for a second time period of at least two hours, and cooling the hot-rolled date tree seeds at for a third time period of at least two hours. The method further includes grinding the cooled date tree seeds sorting the ground date tree seeds into a plurality of chips, each chip having a size in the range of greater than 2.38 millimeters (mm) to less than 6.73 mm. In some embodiments, washing the date seeds includes washing the date seeds using pressurized water with mechanical agitation. In some embodiments, sorting the dried date seeds includes using a plurality of sieves.

DETAILED DESCRIPTION

Figure 1:
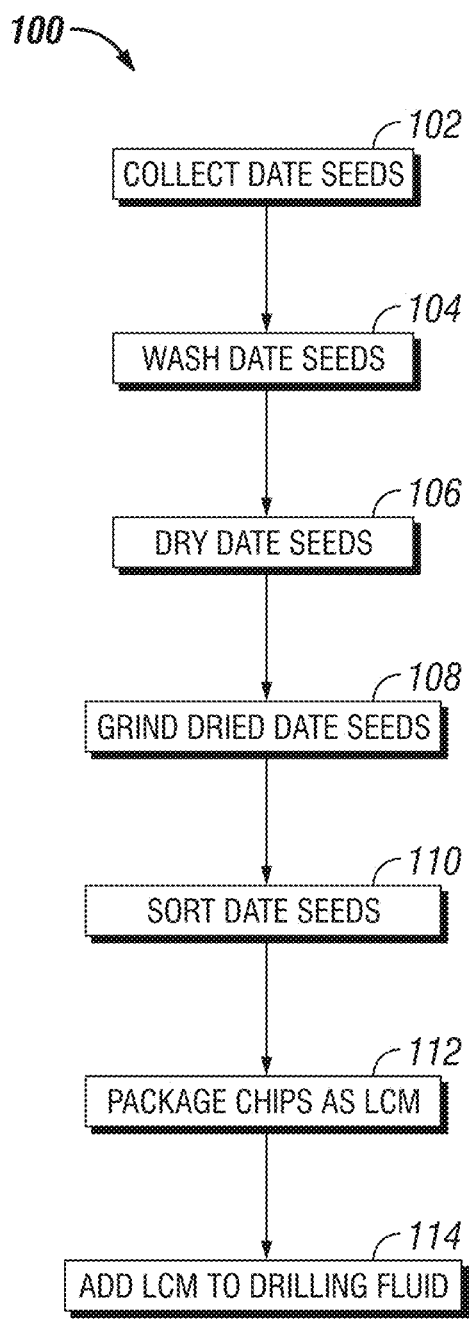
FIG. 1 is a process for the manufacture and use of a date palm seed-based chip LCM in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a date tree seed-based chip lost circulation material (LCM) having chips formed from date tree seeds. As used in the disclosure, the term date palm seeds (also referred to as "date seeds") refers to the seeds produced from date trees (also referred to as "date palms"), such as used in the production of date fruits (also referred to as "dates"). The date tree seed-based chip LCM includes chips having a particle size in the range of greater than 2.38 millimeters (mm) to less than 6.73 mm. The chips formed from date tree seeds may include chips passed through a sieve of 6.73 mm (0.265 inches) mesh size and retained on a sieve of 2.38 millimeters (No. 8) mesh size In some embodiments, the date palm seed-based chip LCM may have a log on grinding index (LOG I) of about 5.5. In some embodiments, the specific gravity of the date palm seed-based chip LCM may be about 1.1. The density of the date palm seed-based chip LCM may be about 1.1 g/cm$^3$. The density of the date palm seed-based chip LCM may ensure minimal to no settlement (that is, settling of the solids at the bottom of a liquid to form a sediment) of the LCM in a fluid tank and fluid circulation system (for example, a drilling fluid circulation system), minimal to no sagging (that is, settling of the solids in a well annulus) in a deviated hole sections, and minimal to no bedding (that is, settling of solids at the bottom) in horizontal wellbores. When introduced into a loss zone, the date palm seed-based chip LCM may form plugs, seals, bridges, flow barriers, or other structures in gaps, fractures, vugs, channels, and other openings having sizes greater than 5 mm.

The date palm seeds may be obtained from pruning waste and date processing plants to provide a sustainable source of material for the date palm seed-based chip LCM. The date palm seeds are obtained from the species *Phoenix dactylifera*. It should be appreciated that, in some embodiments, the date palm seeds may be obtained from genetically modified date trees (that is, genetically modified organisms (GMOs)).

In some embodiments, the date palm seeds may include untreated date palm seeds to preserve the environmentally-friendly and biodegradable properties of the manufacturing process, the date palm seeds, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the chips may be manufactured without treating before, during, or after crushing, grinding, drying, or any other processing.

The date palm seed-based chip LCM may be added to a carrier fluid or a drilling fluid that is circulated (for example, via a pump) to position the LCM into contact with a lost circulation zone in a wellbore. In some embodiments, the date palm seed-based chip LCM may be added directly to a drilling fluid, such as a drilling mud, to create an altered drilling fluid having the date palm seed-based chip LCM. For example, in some embodiments, the date palm seed-based chip LCM may be added to (for example, blended with) an oil-based drilling mud or a water-based drilling mud. In some embodiments, the date palm seed-based chip LCM may be added at the mud pit of a mud system. After addition of the date palm seed-based chip LCM to a drilling fluid, the altered drilling fluid may be circulated at a pump rate effective to position the altered drilling fluid into contact with a lost circulation zone in a wellbore, such that the date palm seed-based chip LCM alters the lost circulation zone (for example, by forming structures in gaps, fractures, vugs, channels, and other openings in a formation).

In some embodiments, the date palm seed-based chip LCM may have a concentration in the range of about 10 pounds-per-barrel (ppb) to about 50 ppb in a drilling fluid. In some embodiments having moderate, the date palm seed-based chip LCM may have a concentration in the range of about 15 ppb to about 30 ppb in a drilling fluid. In some embodiments, the drilling fluid or carrier fluid may be water-based mud, such as a bentonite mud, a potassium chloride (KCl)-polymer mud, a low solids non-dispersed (LSND) mud, a calcium chloride ($CaCl_2$))-polymer mud, a sodium chloride (NaCl)-polymer mud, or other water-based muds. An example bentonite mud may include water, bentonite, caustic soda, and soda ash. An example KCl-polymer mud may include water, caustic soda, soda ash, bentonite, KCl, *Xanthomonas campestris* (XC or xanthan gum) polymer, and a filtrate control additive. In some embodiments, the drilling fluid or carrier fluid may an oil-based mud, such as diesel-, mineral-, or synthetic-oil based muds.

FIG. 1 depicts a process 100 for the production and use of a date palm seed-based chip LCM in accordance with an example embodiment of the disclosure. As shown in FIG. 1, whole date tree seeds may be collected (block 102). In some instances, the whole date seeds are collected from date tree waste produced by date tree farming and date processing industries. The date palm seeds may be washed to remove fruit particles and other debris and foreign substances (block 104), such as by pressurized water or an air jet in a closed loop system with mechanical agitation. The washed whole date seeds may be then be dried using one or more techniques (block 106). In some embodiments, the whole date seeds may be dried using a hot rolling to improve the ductility of the date seeds. In such embodiments, the washed whole date seeds are first air-dried at ambient temperature for a time period of at least two hour, then hot rolled (for example, in a roller oven) at a temperature of at least 80° C. for a time period of at least two hours, then cooled at ambient conditions (temperature and pressure) for a time period of at least two hours.

The dried whole date seeds may then be ground into chips (block 108) using a commercial grinder. The chips may be sorted into different sizes using sieves of the appropriate mesh sizes (block 110). For example, the chips may be sorted using a sieve of 6.73 mm (0.265 inches) mesh size and a sieve of 2.38 millimeters (No. 8) mesh size. The sorted date tree seed-based chips may be packed for transportation and use (block 112). In some embodiments, a suitable amount of packed mixed particles may then be transported to an oil and gas operations site for use as an LCM.

The date palm seed-based chip LCM may be added directly to a drilling fluid (block 114), such as a drilling mud, to create an altered drilling fluid having the date palm seed-based chip LCM. For example, in some embodiments, the date palm seed-based chip LCM may be added to (for example, blended with) an oil-based drilling mud or a water-based drilling mud. In some embodiments, the date palm seed-based chip LCM may be added at the mud pit of a mud system.

After addition of the date palm seed-based chip LCM to a drilling fluid, the altered drilling fluid may be circulated at a pump rate effective to position the drilling fluid into contact with a lost circulation zone in a wellbore, such that the date palm seed-based chip LCM alters the lost circulation zone (for example, by entering and blocking gaps, fractures, vugs, channels, and other openings in a formation in the lost circulation zone). In some embodiments, the lost circulation zone may be a moderate loss zone or a severe loss zone, including loss zones having gaps, fractures, vugs, channels, and other openings greater than 5 mm in size. The date palm seed-based chip LCM may form structures (for example, plugs or seals) at gaps, fractures, vugs, channels, and other openings in a loss zone. In some embodiments, the reduced rate of lost circulation may be negligible.

In other embodiments, the date palm seed-based chip LCM and one or more additional LCMs may be added to a drilling fluid, such as a drilling mud, to create an altered drilling fluid having the LCMs. For example, in some embodiments, the date palm seed-based chip LCM and one or more additional LCMs may be added to an oil-based drilling mud or a water-based drilling mud.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a date palm seed-based chip LCM was prepared and evaluated against a commercially available LCM. The example date palm seed-based chip LCM included chips having a particle size in the range of greater than 2.38 millimeters (mm) to less than 6.73 mm.

The degradation potential of the example date palm seed-based chip LCM was evaluated by measuring the loss on grinding index (LOG I). The loss on grinding index was measured by determining the ratio of material lost after two hours of wet grinding to the original mass of the material. The wet grinding was performed to simulate the attrition effect of surface and subsurface tools and the hydrodynamic forces of circulating fluid that would impact an LCM. The wet grinding test used a test cell to simulate a piece of a wellbore, a free rotating metal cylinder to simulate the attrition effect of surface and subsurface tools and equipment, and water as the carrier fluid to simulate hydrodynamic forces. The wet grinding test used rotating equipment to the rotate the test cell at a rotational speed of about 35 revolutions per minute (rpm) to simulate aggressive hydrodynamic forces.

The example date tree seed-based chip LCM was compared against three commercially available calcium carbonate chips. The LOG I of the each of the three calcium carbonate chips was measured using the same testing conditions. About 20 to 25 grams (g) of the example date tree seed-based chip LCM or the calcium carbonate ($CaCO_3$) chips were placed in the test cell and rotated at the rotational speed for a time period of about two hours at room temperature. The mass of the material lost was measured and used to determine the LOG I from the original 25 g.

Figure 2:
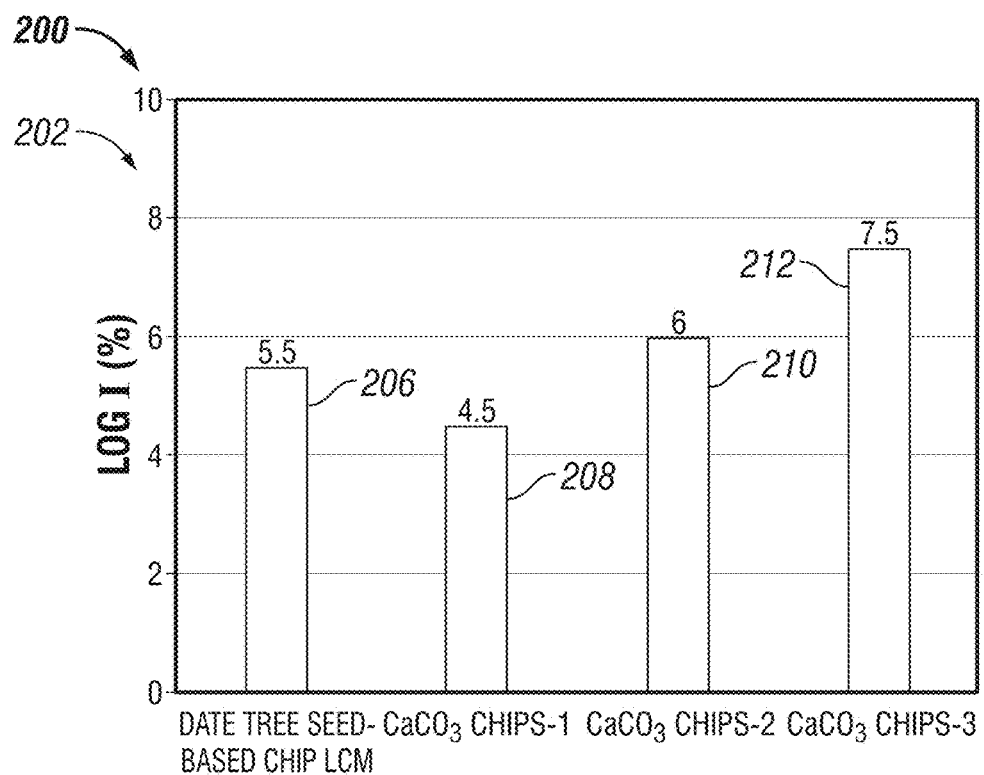
FIG. 2 is a bar graph depicting the measured log on grinding index (LOG I) for an example date palm seed-based chip LCM and the three commercially available calcium carbonate chips in accordance with an embodiment of the disclosure.

FIG. 2 is a bar graph 200 depicting the measured LOG I for the example date palm seed-based chip LCM and each of the three commercially available calcium carbonate chips. The y-axis 202 depicts the LOG I (in percentage (%)), and the x-axis 204 depicts each tested material. As shown in FIG. 2, the example date palm seed-based chip LCM (illustrated by bar 206) had a LOG I of 5.5. As also shown in FIG. 2, the first commercially available calcium carbonate chips (illustrated by bar 208) had a LOG I of 4.5, the second commercially available calcium carbonate chips (illustrated by bar 210) had a LOG I of 6, and the third commercially available calcium carbonate chips (illustrated by bar 212) had a LOG I of 7.5. Thus, the date tree seed-based chip LCM exhibited on average similar performance to the commercially available calcium carbonate chips. The results of the degradation testing show that the date tree seed-based chip LCM has similar degradation resistance to the calcium carbonate chips when subjected to simulated mechanical and hydrodynamic forces encountered in a wellbore during operations and fluid circulation.

Figure 3:
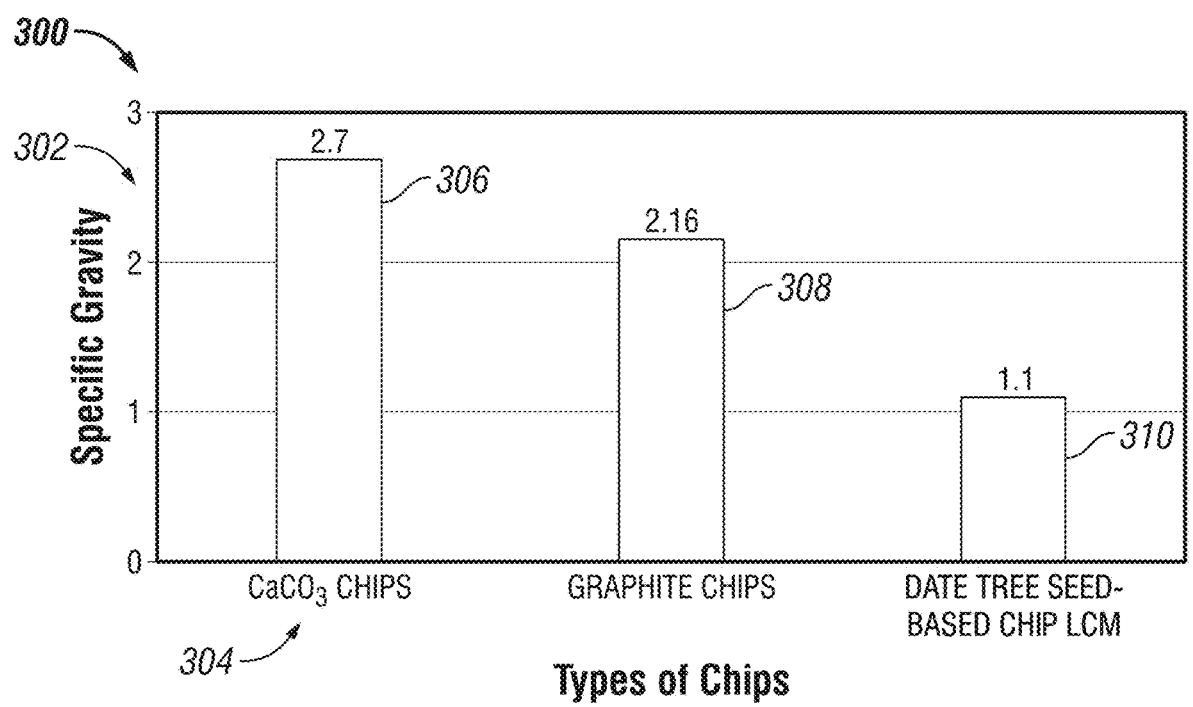
FIG. 3 is a bar graph of the specific gravities of an example date palm seed-based chip LCM and the two commercially available calcium carbonate chips in accordance with an embodiment of the disclosure.

The specific gravity of the example date palm seed-based chip LCM was also determined and compared against commercially available calcium carbonate chips and commercially available graphite chips. FIG. 3 is a bar graph 300 of the specific gravities of the example date palm seed-based chip LCM and the two commercially available calcium carbonate chips. The y-axis 302 corresponds to the specific gravity, and the x-axis 304 corresponds to each material. As shown in FIG. 3, the commercially available calcium carbonate chips (illustrated by bar 306) have a specific gravity of 2.7, and the commercially available graphite chips (illustrated by bar 308) have a specific gravity of 2.16. As also shown in FIG. 3, the example date tree seed-based chip LCM (illustrated by bar 310) has a specific gravity of 1.1. Thus, the example date tree seeds LCM has a specific gravity about 2.45 times less than the commercially available calcium carbonate chips and about 1.9 times less than the commercially available graphite chips. As compared to the calcium carbonate chips or graphite chips, the reduced specific gravity of the example date palm seed-based chip LCM may enable easier suspension of the LCM in a drilling fluid or carrier fluid with no or negligible settlement or sagging while circulating, thus providing for easier placement in a loss zone and increasing the likelihood of a successful LCM treatment.

The suspension capacity of the example date palm seed-based chip LCM and one of the commercially available calcium carbonate chips were evaluated using a vicious fluid having viscous characteristics similar to a carrier fluid typically used in oil and gas well drilling. The viscous fluid was prepared by mixing 2.5 g of XC polymer (xanthan gum) in 350 cubic centimeters (cc) of water and mixing using a commercially available mixer. The resulting carrier fluid had low shear yield point (LSYP) equal to 19.5 lbs/100 ft$^2$. The date palm seed-based chip LCM and calcium carbonate chips were placed in separate containers with the viscous fluid, stirred, and observed over a time period of about 2 minutes to 5 minutes.

Figure 4A:
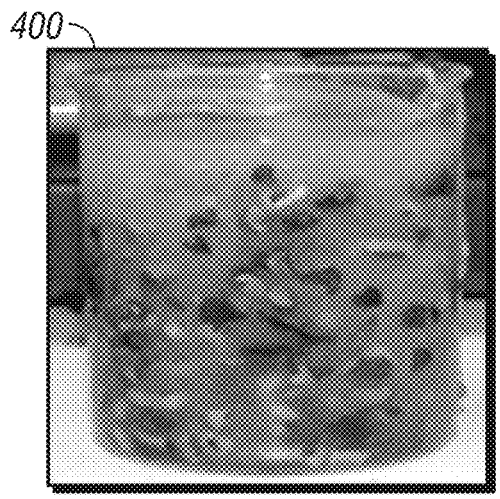
FIGS. 4A and 4B are photographs of an example date palm seed-based chip LCM and commercially available calcium carbonate chips in a viscous fluid after a time period in accordance with an embodiment of the disclosure.
Figure 4B:
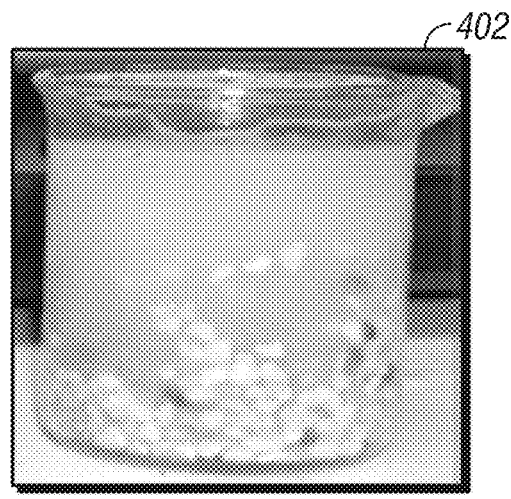

FIG. 4A is a photograph 400 of the example date palm seed-based chip LCM in the viscous fluid after the time period, and FIG. 4B is a photograph 402 of the calcium carbonate chips in the viscous fluid after the time period. The date seed-based chips were initially suspended in the carrier fluid and, as shown in FIG. 4A, the date seed-based chips remained suspended in the carrier fluid after the time period. In contrast, as shown in FIG. 4B, the calcium carbonate chips showed poor suspension capability and quickly settled at the bottom of the container of viscous fluid. The reduced suspension capacity and greater settlement of the calcium carbonate chips indicate that it may be difficult to transport the calcium carbonate chips to a loss zone and enable sealing, plugging, and blocking of gaps, fractures, vugs, and channels in the loss zone. In contrast, the greater suspension capacity and zero or negligible settlement of the date tree seed-based chips may provide for the transportation of nearly all of the chips in a fluid to a loss zone for effective sealing, plugging, and blocking of gaps, fractures, vugs, and channels in the loss zone. Based on the results of the testing, the date palm seed-based chip LCM will likely have minimal to no settling or sagging during pumping or placement into a loss zone, thus improving the likelihood of success of an LCM treatment in such zones.

Figure 5:
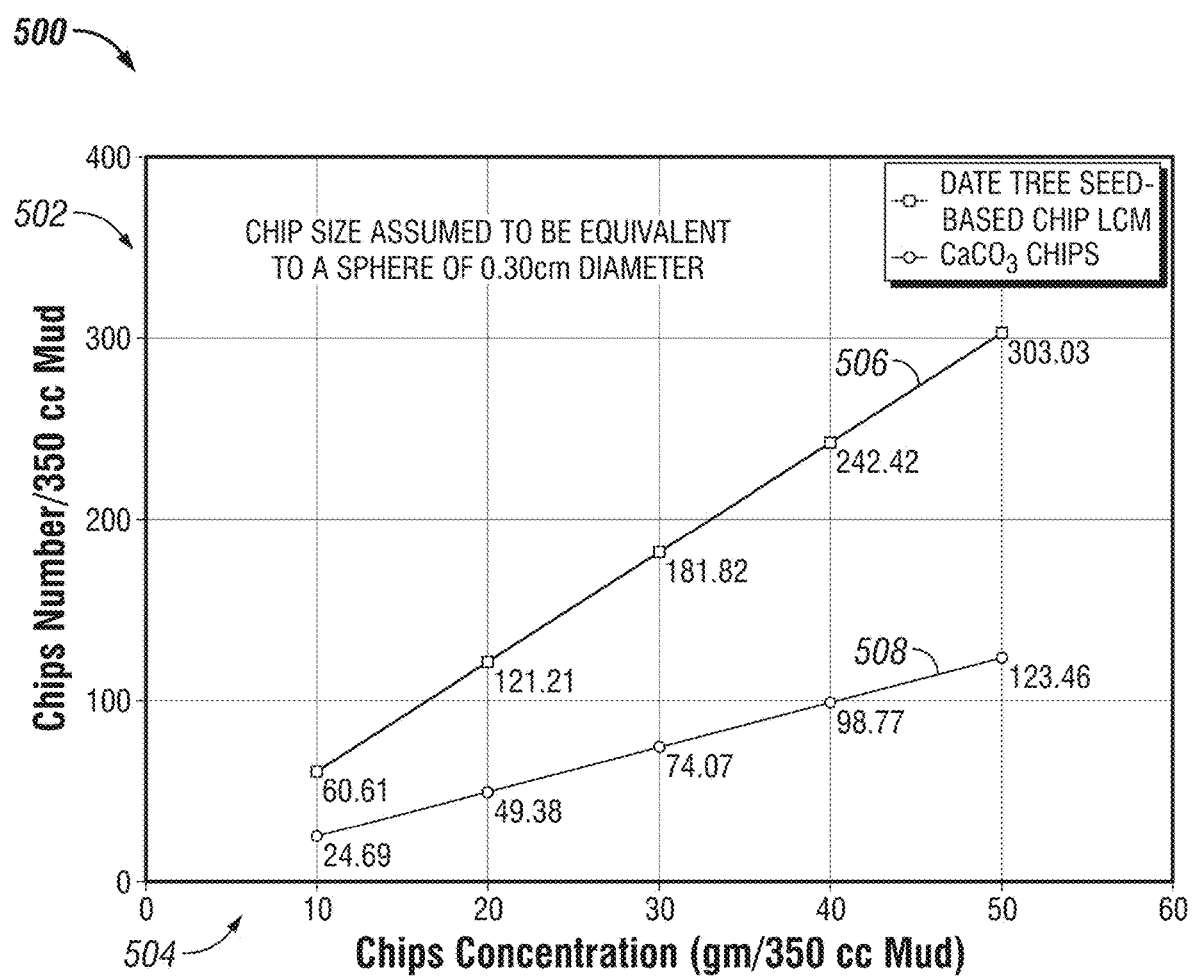
FIG. 5 is a graph of the number of chips per 350 cubic centimeters (cc) of drilling mud for an example date tree seed-based LCM and commercially available calcium carbonate chips in accordance with an embodiment of the disclosure.

Moderate to severe loss zones typically have greater concentrations of gaps, fractures, vugs, and channels than other types of loss zones. LCMs that provide a greater number of particles per unit mass will transport a greater number of particles into such loss zones. Accordingly, the number of particles per unit mass for the example date tree seed-based chip LCM was determined and compared to one of the commercially available calcium carbonate chips. For the determinations, the chip size was assumed to be equivalent to a sphere having a diameter of 0.30 centimeters (cm). FIG. 5 is a graph 500 of the number of chips per 350 cubic centimeters (cc) of drilling mud for the date tree seed-based LCM and the one of the commercially available calcium carbonate chips. The y-axis 502 corresponds to the number of chips/350 cc of drilling mud (chip number/350 cc mud) and the x-axis 504 corresponds to the chips concentration in grams per 350 cc of drilling mud (gm/350 cc mud). The chip concentration for the date tree seed-based chip LCM is shown by line 506, and the chip concentration for the calcium carbonate chips is shown by line 508. As shown in FIG. 5, the date tree seed-based chip LCM provides more than twice the number of particles as compared to the calcium carbonate chips at the same mass concentration. The greater number of particles per unit mass shows that the date tree seed-based chip LCM has a greater likelihood of plugging, sealing, and blocking the channels, gaps, fractures, vugs, channels, and other openings in a loss zone as compared to the calcium carbonate chips.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to reduce lost circulation of a drilling fluid in a wellbore in a formation, comprising:
   introducing an altered drilling fluid into the wellbore while drilling such that a loss circulation material (LCM) contacts a lost circulation zone, wherein the altered drilling fluid comprises the drilling fluid and the LCM, wherein the LCM consists of a plurality of chips produced from date tree seeds, each of the plurality of chips having a size in the range of greater than 2.38 millimeters (mm) to less than 6.73 mm,
   wherein the plurality of chips are produced by:
      washing the date tree seeds; drying the date tree seeds after the washing, the drying comprising: air-drying the date tree seeds for a first time period of at least two hours to obtain air-dried date tree seeds; hot rolling the air-dried date tree seeds at a temperature of at least 80° C. for a second time period of at least two hours to obtain hot-rolled date tree seeds; and cooling the hot-rolled date tree seeds for a third time period of at least two hours to obtain cooled date tree seeds; grinding the cooled date tree seeds to obtain ground date tree seeds; and sorting the ground date tree seeds into the plurality of chips.

2. The method of claim 1, wherein the altered drilling fluid consists of the drilling fluid and the LCM.

3. The method of claim 1, wherein the drilling fluid comprises a water-based drilling mud or an oil-based drilling mud.

4. The method of claim 1, wherein the LCM comprises a specific gravity of 1.1.

\* \* \* \* \*